US008838831B2

(12) United States Patent
Thomson et al.

(10) Patent No.: US 8,838,831 B2
(45) Date of Patent: Sep. 16, 2014

(54) POPULATING LOCATION WIREMAP DATABASES

(75) Inventors: Allan Thomson, Pleasanton, CA (US); David S. Stephenson, San Jose, CA (US); Subhasri Dhesikan, San Jose, CA (US); Vijayaraghavan Doraiswami, Mountain View, CA (US); Shree Murthy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1424 days.

(21) Appl. No.: 11/742,971

(22) Filed: May 1, 2007

(65) Prior Publication Data
US 2008/0276004 A1    Nov. 6, 2008

(51) Int. Cl.
| H04L 12/58 | (2006.01) |
| H04L 29/08 | (2006.01) |
| H04W 4/02 | (2009.01) |
| H04L 29/12 | (2006.01) |

(52) U.S. Cl.
CPC ............... *H04W 4/02* (2013.01); *H04L 67/18* (2013.01); *H04L 61/2015* (2013.01); *H04L 29/12226* (2013.01)
USPC ........................... 709/244; 709/241; 370/351

(58) Field of Classification Search
USPC ........................... 709/204–245; 370/351–401
See application file for complete search history.

(56) References Cited

U.S. PATENT DOCUMENTS

| 6,101,188 | A * | 8/2000 | Sekine et al. ................. 370/401 |
| 7,130,385 | B1 * | 10/2006 | Moon ............................. 379/45 |
| 7,286,530 | B2 | 10/2007 | Lupper et al. |
| 7,363,137 | B2 * | 4/2008 | Brant et al. ...................... 701/50 |
| 7,385,947 | B2 | 6/2008 | Wu et al. |
| 7,483,396 | B2 * | 1/2009 | Steindl ........................... 370/254 |
| 7,564,795 | B2 * | 7/2009 | Stephenson et al. ........... 370/245 |
| 7,567,805 | B2 | 7/2009 | Cox et al. |
| 2004/0030750 | A1 * | 2/2004 | Moore et al. ................... 709/204 |
| 2004/0078490 | A1 * | 4/2004 | Anderson et al. .............. 709/245 |
| 2005/0185618 | A1 | 8/2005 | Friday et al. |
| 2005/0195109 | A1 | 9/2005 | Davi et al. |
| 2005/0208952 | A1 | 9/2005 | Dietrich et al. |
| 2005/0232164 | A1 * | 10/2005 | Anzarouth et al. ............ 370/255 |
| 2005/0261004 | A1 | 11/2005 | Dietrich et al. |
| 2006/0030340 | A1 * | 2/2006 | Lin et al. ........................ 455/457 |
| 2006/0114839 | A1 | 6/2006 | Meier et al. |

(Continued)

FOREIGN PATENT DOCUMENTS

| EP | 1 445 893 A2 | 8/2004 |
| EP | 1-445-893 A2 | 8/2004 |

OTHER PUBLICATIONS

Cisco IOS Configuration Fundamentals Guide, *Configuring Cisco Discovery Protocol*, pp. FC-277-FC-280.

(Continued)

*Primary Examiner* — Bunjob Jaroenchonwanit
(74) *Attorney, Agent, or Firm* — Baker Botts L.L.P.

(57) ABSTRACT

A method for populating location wiremap databases. In particular implementations, a method includes establishing a link layer connection with a client on a switch port, where the switch port is associated with a port identifier and is mapped to a location; identifying one or more connection attributes of the connection, where the connection attributes comprise a network layer address of the client; and transmitting the port identifier and the network layer address of the client to a location server.

15 Claims, 5 Drawing Sheets

(56) References Cited

U.S. PATENT DOCUMENTS

| | | | |
|---|---|---|---|
| 2006/0120517 A1* | 6/2006 | Moon et al. | 379/45 |
| 2007/0025306 A1 | 2/2007 | Cox et al. | |
| 2007/0091834 A1* | 4/2007 | Lee | 370/310 |
| 2007/0293236 A1* | 12/2007 | Cox et al. | 455/456.1 |
| 2007/0298761 A1* | 12/2007 | Bani Hani | 455/404.2 |
| 2008/0037715 A1* | 2/2008 | Prozeniuk et al. | 379/45 |
| 2008/0049686 A1* | 2/2008 | Golash et al. | 370/338 |
| 2008/0101240 A1* | 5/2008 | Rohilla et al. | 370/236 |
| 2008/0205377 A1* | 8/2008 | Chao et al. | 370/351 |
| 2008/0270588 A1* | 10/2008 | Sultan et al. | 709/223 |
| 2009/0037565 A1* | 2/2009 | Andresen et al. | 709/222 |
| 2009/0138619 A1* | 5/2009 | Schnizlein et al. | 709/245 |
| 2010/0023603 A1* | 1/2010 | Archer et al. | 709/220 |

OTHER PUBLICATIONS

Cisco Systems Data Sheet, *Ciscoworks Wireless LAN Solution Engine 2.9*, Copyright 1992-2004, Cicso Systems, pp. 1-17.

Narasimhan, P. (Aruba Networks) Harkins, D. (Trapeze Networks) and Ponnuswamy, S. (Aruba Networks); "SLAPP: Secure Light Access Point Protocol", The Internet Society (2005), May 31, 2005.

SpectrumSoft Wireless Network Management System, Spectrum 24 Software, publication date Jun. 30, 2000.

Dan Simone, 802.11k makes WLANS measure up, Network World, Mar. 29, 2004, www.networkworld.com/news/tech/2004/0329techupdate.html.

Muthukrishnan, et al., WLAN Location Sharing Through a Privacy Observant Architecture, University of Twente, Computer Architecture Design and Test for Embedded Systems Group (Oct. 2005).

Unknown, "Configuring Cisco Discovery Protocol," *Cisco IOS Configuration Fundamentals Guide*, date unknown, pp. FC-277-FC-280.

Unknown, "Ciscoworks Wireless LAN Solution Engine 2.9," *Cisco Systems Data Sheet*, copyright 1992-2004, Cisco Systems, Inc., pp. 1-17.

Narasimhan, P. (Aruba Networks), Harkins, D. (Trapeze Networks) and Ponnuswamy, S. (Aruba Networks): "SLAPP: Secure Light Access Point Protocol," The Internet Society (2005), May 31, 2005, 75 pages.

Non-Final Office Action dated Dec. 29, 2008, U.S. Appl. No. 11/195,536.

PCT Notification of Transmittal of the International Search Report and The Written Opinion of the International Searching Authority, PCT Application No. PCT/US2006/029660, dated Sep. 11, 2006, 12 pages.

SpectrumSoft Wireless Network Management System, Spectrum 24 Software, publication date Jun. 30, 2000, 3 pages.

* cited by examiner

POPULATING LOCATION WIREMAP DATABASES

TECHNICAL FIELD

This disclosure relates generally to location services in computer networks.

BACKGROUND

Location functionality in wireless network systems has been developing in order to adapt to the mobility of wireless clients and offer location-based services or other functionality. For example, in some applications, the wireless network infrastructure may provide location information (e.g., the MAC address of a wireless access point or a basic service set identification (BSSID)) to a wireless client during an initial association between the wireless access point and to a wireless client. For wireless networks, wireless device location can be estimated by the location server based on radio frequency (RF) measurements gathered from controller devices. In wired networks, a physical switch port has a static mapping of its location, and this mapping is either administered locally at the switch, or at a central server such as a Dynamic Host Configuration Protocol (DHCP) server or location server. Typically, however, there is no mechanism for synchronizing the location of a wired client or switch port with a location server.

DESCRIPTION OF EXAMPLE EMBODIMENTS

A. Overview

Particular implementations facilitate the synchronization of static location information between one or more switches and a location server. In one particular implementation, a user may configure one or more port-to-location mappings that associate a port of a switch to a location. This configuration of a given switch may be performed locally at the switch or remotely at a central node, such as a location server. In one implementation, a synchronization method may be applied to synchronize configuration information between the switches and the location server (or central node). In one implementation, if the switch port location is configured locally, the switch may transmit this configuration information to one or more location servers. In one implementation, if the switch port location is configured remotely at a location server or central node, the location server or central node may transmit the configuration information to the switch. Configuration information may be stored in a configuration database at the switch and in a configuration database at the location server, at any other suitable location. In one implementation, whenever the configuration information changes (e.g., a change to a port-to-location mapping), the switch may transmit updated configuration information to the location server, and vise versa, in order to synchronize the databases and keep them current.

As discussed in more detail below, as wired clients establish connections on a switch port, a switch may transmit one or more connection attributes to a location server. In one implementation, the connection attributes may include a client attribute tuple such as a client media access control (MAC) address, a client Internet Protocol (IP) address, a virtual local area network identification (VLAN ID), etc. The connection attributes may also include switch information such as a switch ID, chassis ID, port ID, etc. In one implementation, the switch is operable to provide location information (e.g., client location) to the client as well.

B. Example Network System Architecture

B.1. Network Topology

Figure 1:
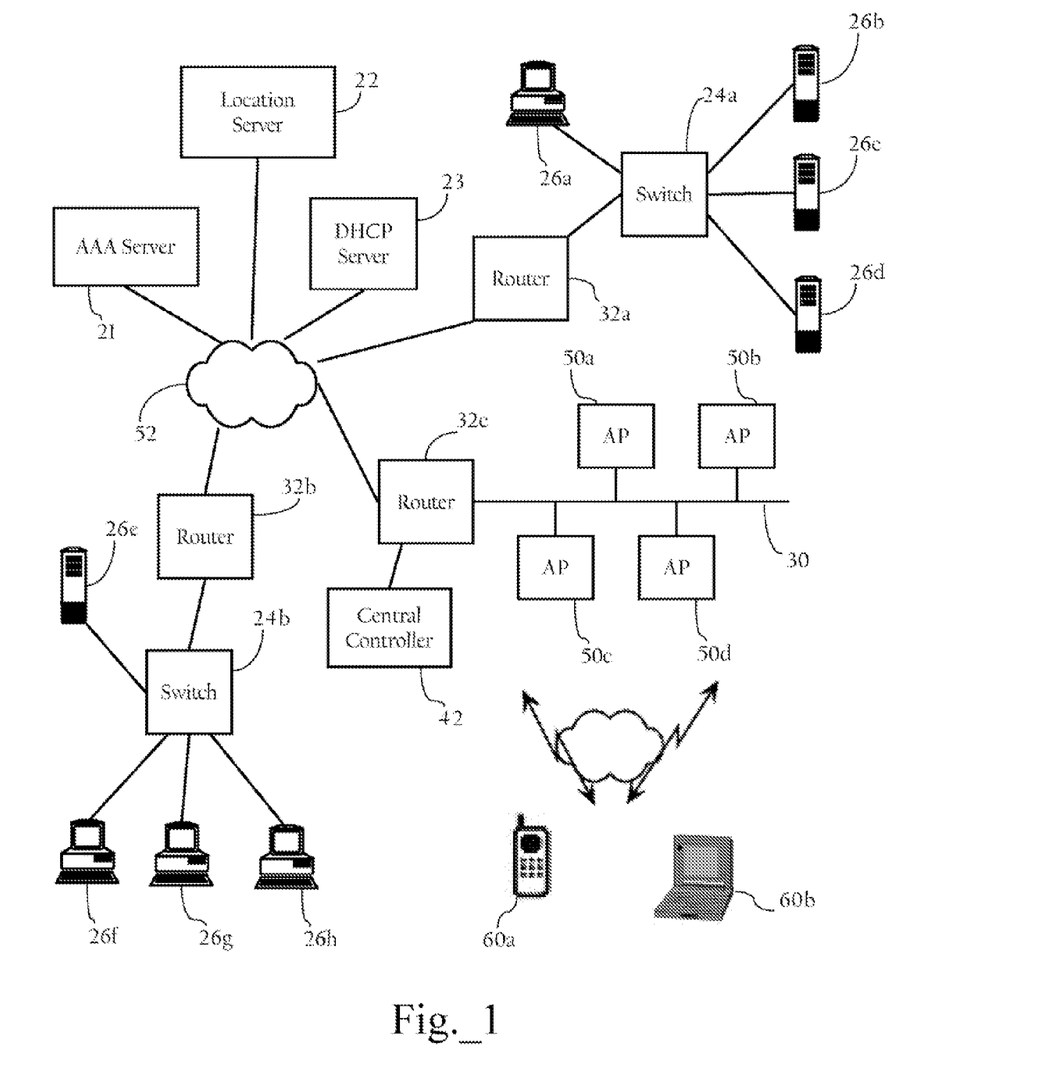
FIG. 1 illustrates example components in a network environment.

FIG. 1 illustrates example components in a network environment. In a specific embodiment of the present invention, the system includes an Authentication Authorization and Account (AAA) server 21, location server 22, and a DHCP server 23. The system also includes switches 24a and 24b operably connected to clients 26a, 26b, 26c, 26d, 26e, 26f, 26g, and 26h (such as servers, client computers, etc.) and operatively connected to each other via routers 32a and 32b. In some implementations, the clients 26 need not be connected to a switch but may be connected to a router or any other suitable network access device. The system also includes a router 32c, a central controller 42, a local area network (LAN) 30, and wireless access points 50a, 50b, 50c, and 50d. In one implementation, the connections between the wireless access point 50a-d and the LAN 30 may be implemented by a switch (or an array of switches) and/or other network devices, such as a bridge.

As FIG. 1 illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between the servers 21, 22, and 23 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1 illustrates one possible network environment in which the invention may operate; however, other implementations are possible. For example, although servers 21, 22, and 23 are illustrated as being on a different LAN or LAN segment, they may be co-located with wireless access points 50.

The wireless access points 50 are operative to wirelessly communicate with remote wireless client devices 60a and 60b. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or light-weight wireless access points operating in connection with a wireless switch (not illustrated). In addition, the network infrastructure may also include a Wireless LAN Solution Engine (WLSE) offered by Cisco Systems, Inc. of San Jose, Calif. or another wireless network management system.

In some implementations, the network infrastructure may also include one or more Wireless Control System (WCS) nodes operative to manage one or more wireless switches and access points.

B.2. Location Server

Figure 2:
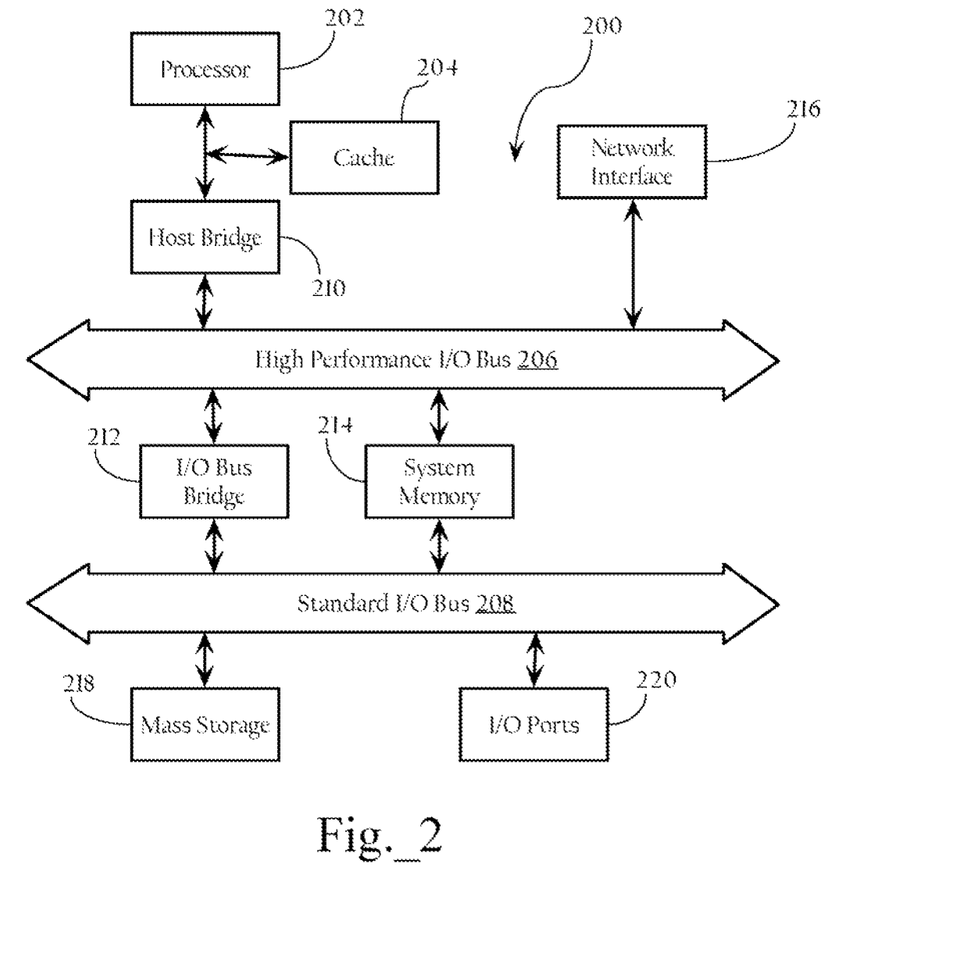
FIG. 2 illustrates an example hardware system, which may be used to implement a location server.

FIG. 2 illustrates an example hardware system, which may be used to implement a location server. In one implementation, hardware system 200 comprises a processor 202, a cache memory 204, and one or more software applications and drivers directed to the functions described herein. Additionally, hardware system 200 includes a high performance input/output (I/O) bus 208 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif. as well as any other suitable processor.

The elements of hardware system 200 are described in greater detail below. In particular, network interlace 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures: and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the location server 22 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used, with other suitable operating systems, such as the Apple Macintosh Operating System, available from Apple Computer Inc. of Cupertino, Calif., UNIX operating systems, LINUX operating systems, and the like.

While the location server 22 may typically be used in connection with locations of wireless nodes in wireless networks, the location server 22 may also be used in connection with locations of wired nodes in wired networks. For example, as described in more detail below, the location server 22 may provide location information via location services to clients (both wireless and mired clients).

B.3. Switch

Figure 3:
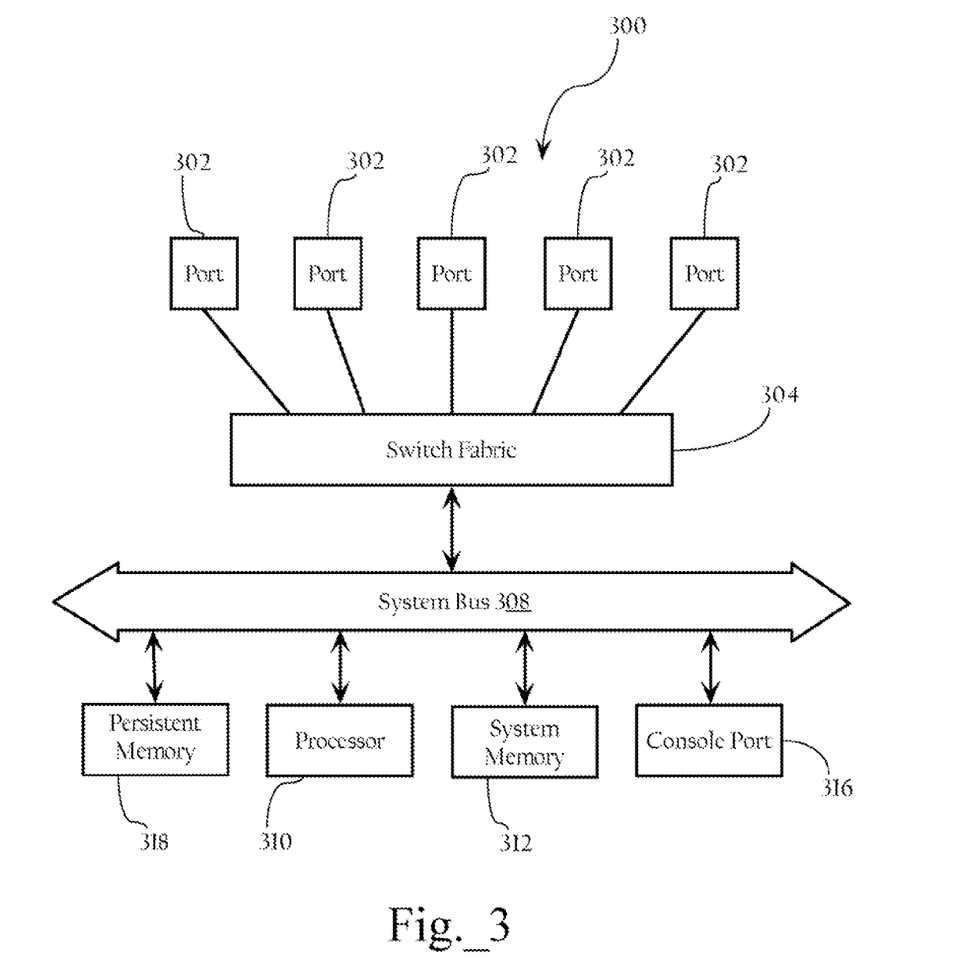
FIG. 3 illustrates an example hardware system, which may be used to implement a switch.

FIG. 3 illustrates an example hardware system 300, which may be used to implement a switch (e.g., switches 24a and 24b). In one implementation, switches 24a, 24b are Ethernet switches. In one implementation, hardware system 300 includes a processor 310, system memory 312, persistent memory 318 (e.g., flash memory or a hard disk drive), a switch fabric 304 connected to a plurality of ports 302, a system bus 308 interconnecting these components, and one more software modules (loadable into system memory 312) directed to network switching functions (e.g., switch fabric configuration, BPDU processing and the like) and one or more software modules directed to managing clients and wireless access points. In one implementation, ports 302 may be Ethernet interfaces. The switch may optionally include a console port 316 allowing for administrative access for purposes such as configuration and diagnostics.

C. Port-to-Location Mapping Configuration

During deployment of a given network, an administrator physically deploys a switch, or other network access device, at a particular location (e.g., in a wiring closet) and deploys the location server at another location (e.g., in the network operation center (NOC)), and then runs cable from the switch through a patch panel to various desired locations, such as cubicles, conference rooms, etc. While particular implementations described refer to switches and connection attribution information between exchanged between a switch and a location server, such connection attribute information may be exchanged between any suitable network access devices (e.g., routers, etc.). In one implementation, the administrator may access an interface (e.g., console port 316) of the switch 24 to configure port-to-location mappings, where a given port is mapped to a specific physical location. In one implementation, the physical location may be defined relative to any kind of coordinate system or convention. For example, the physical, location may be specified in absolute coordinates (e.g., civic/postal addresses corresponding to offices, cubicles, etc.) or relative geographical coordinates. For each port/patch panel, at the wired switch console (or network access device, router, etc.), the administrator enters the cubicle location that maps to it. In one implementation, one or more of the ports in the switch/router/network access device may have the same address. In one implementation, as a part of the data entry, the location may be entered using a predefined location schema (such as Geopriv), which may be prompted at the console. Alternatively, the location may be learned from the location server. The switch 24 stores the location information, and, as described in more detail below, uses a location protocol to transmit the data entered, as well as other connection attribute information, directly to the location server 22. The connection attribute information is then stored at the location server 22 for subsequent use.

In some particular implementations, the administrator may locally configure the ports of the switch 24 with a predefined mapping at the switch 24, which, may then provide the port-to-location mapping to the location server 22 (or central node). Alternatively, the administrator may remotely configure the ports of the switch 24 from a central point such as the location server 22 without having to be physically at the switch 24. The location server 22 may then provide the port-to-location mapping to the switch 24. In some implementations, the switch 24 and location server 22 may each locally maintain a configuration database with the port-to-location mapping for one or more switches being managed. In other implementations, any other suitable network node may maintain the configuration database, which the switch 24 and location, server 22 may access.

D. Switch and Location Server Functions

Figure 4:
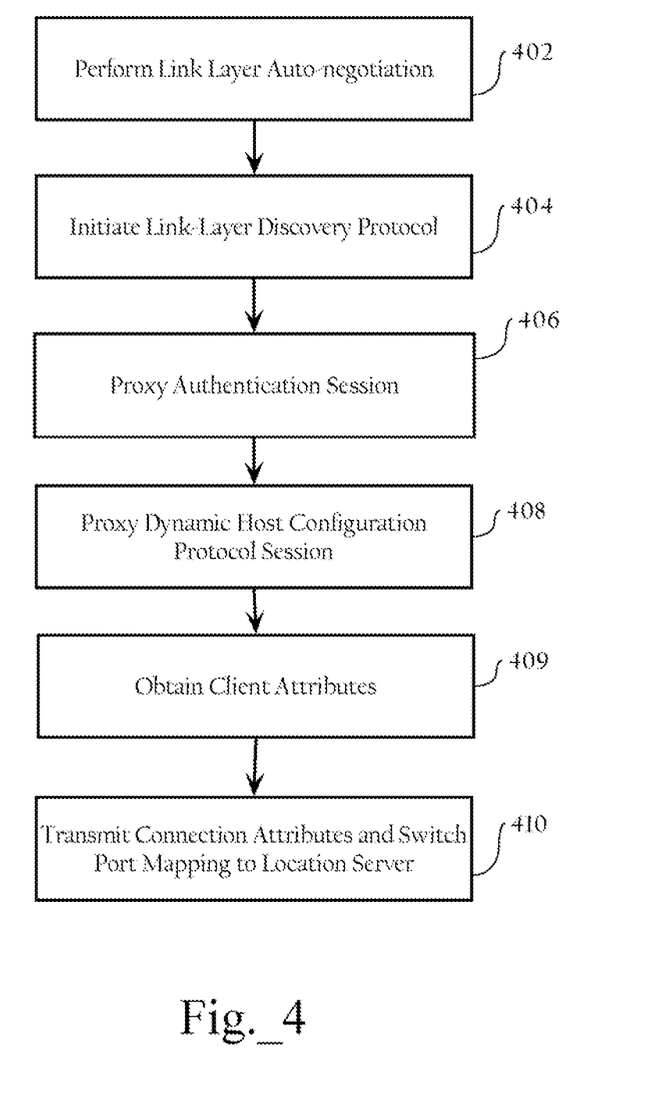
FIG. 4 illustrates an example process flow implemented, between a client and a switch and other network elements during the initiation of a client connection to a network.

FIG. 4 illustrates an example process flow implemented between a client and a switch and other network elements during the initiation of a client connection to a wired, network. When a client 26 connects to the switch 24, the switch 24 and client 24 may optionally perform a link layer auto-negotiation with the client 26 (402) and initiate a discovery protocol session (404). In one implementation, the client 26 may transmit the discovery protocol message to indicate its presence on the network, to other devices (e.g., switch 24), and to learn about its location in the network environment through a query-response mechanism. In particular implementations, the discovery protocol session may be a Cisco Discovery Protocol (CDP) session or a Link Layer Discovery Protocol—media endpoint discovery (LLDP-MED) session. In one implementation, CDP and LLDP-MED is a link layer discovery mechanism that a client 26 may use to collect connection information (e.g., port information) about the switch 24, and vice versa. In particular implementations, the CDP and LLDP-MED are a continuous processes that may capture any changes that may occur during the lifetime of the connection between the client 26 and the switch 24. In one implementation, the CDP and LLDP-MED may be extended to enable the switch 24 to provide location information to the client 26 via a connecting port after it receives location information from the location server for example. Other neighbor discovery mechanisms and protocols may also be used.

In the implementation shown, the switch may also proxy an authentication session between the client 26 and an authentication server 21 (406) and may proxy a DHCP session (and/or act as a BootP relay agent) between the client 26 and the DHCP server 23 (408). DHCP is a protocol that the DHCP server 23 may utilize to dynamically assign and provide an IP address to the client 26. In particular implementations, the client 26 sends a DHCP request to the switch 24, which forwards the request to the DHCP server 23. The DHCP server 23 may then provide an IP address and other parameters to the client 26 via the switch 24 in a DHCP OFFER message. In one implementation, as the switch 24 proxies the authentication and DHCP transactions, the switch 24 may obtain client attributes (e.g., learn about the authentication details and learn the client's IP address) (409), which the switch 24 may provide to the location server 22 with other parameters. Furthermore, in one implementation, the client may also obtain a user ID (e.g., username, Extensible Authentication Protocol (EAP) ID. In particular implementations, the switch 24 may resolve the user ID in a dot1x exchange or may provide the user name as another identifying user attribute. In one implementation, the switch 24 may request an EAP ID from the authentication server 21 after a successful authentication.

The switch 24 then transmits the connection attributes in a client location message to the location server 22 using, in one particular implementation, a predefined location protocol (410). In one implementation, the location server 22 may respond with location information for the client, which the switch may provide to the client as part of a link layer discovery or other process. In one implementation, the connection attributes may include a client attribute tuple, switch information, and port-to-location mappings. In one implementation, the client attribute tuple may include the client MAC address, which the switch 24 learns once it connects to the client 26, the client IP address, a virtual local area network identification (VLAN ID), and User ID/credentials to which the client 26 is associated. In one implementation, the switch information may include the switch IP address and the port ID to which the client 26 is connected. The switch 24 may also provide the location to which the port ID is mapped as reflected in its local configuration database. In one implementation, the location server 22 may have port switch-to-location mapping. The switch 24 may learn client attributes from the port-to-location mapping. A location message, which is exchanged between the switch 24 and the location server 22, may dynamically tie this information together.

Figure 5:
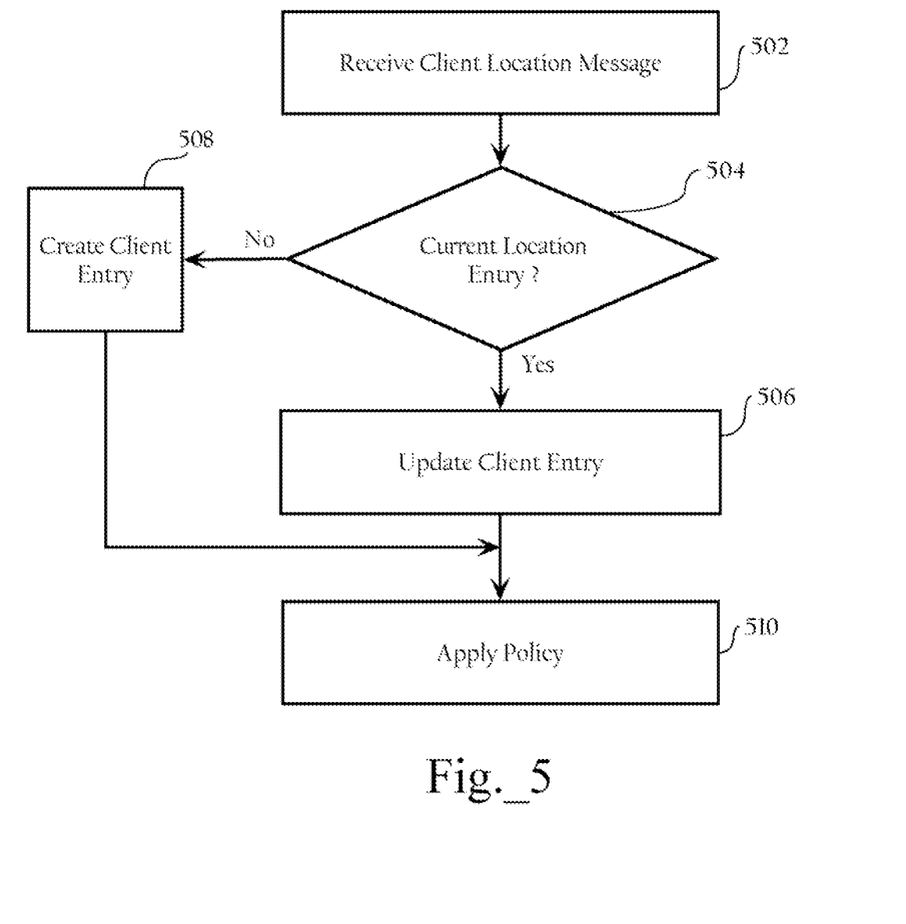
FIG. 5 illustrates an example process flow implemented at a location server.

FIG. 5 illustrates an example process flow implemented at a location server. As FIG. 5 shows, the location server 22 receives a client location message from the switch 24 (502). The location server 22 then determines if it has a current location entry for the client (504). If the location server 22 has a current location entry for the client, the location server 22 updates a client entry with the new connection attributes (506). For example, the location server 22 updates the association between the client 26 and its location. In one implementation, the location server 22 may access its configuration database to map the port identified by the switch to a location. In one implementation, if the switch reported a port-to-location mapping that is different from that which the location server 22 may have stored, the location server 22 may apply a policy to resolve the differences. For example, in one implementation, a policy may be to use the latest port-to-location mapping, which may be based on a time stamp associated with the port-to-location mapping. If the location server 22 has not seen the client 26 before, the location server creates a new client entry (508). In one implementation, if the switch 24 provides a port-to-location mapping, the location server 22 includes the port-to-location mapping in the client entry and applies one or more policies if any differences between the port-to-location mapping stored at the location server 22 are identified. In one implementation, if the switch 24 does not provide the port-to-location mapping, the location server 22 may generate the mapping based on the connection attributes, as discussed above.

The location server 22 may also perform additional actions, such as applying a location services policy (510). In some implementations, the location server 22 or other network infrastructure (e.g., DHCP server 23) may provide location information to clients via location services. The location server 22, in one implementation, supports a plurality of location services, such as on-demand location services and update location services, where update location services may include automatic location updates, conditional location updates, and the like. An on-demand location service, for example, may provide location information that describes where a particular client is located in a particular region (e.g., within one square meter in accuracy) within in a particular city, campus, or building. An update (i.e., subscription) location service may also provide location information (e.g., where a particular client 26 is located in a particular city, campus, or building), but the delivery of the location information may be based on one or more triggers, which may include the occurrence of one or more events including time interval triggers, movement, containment, etc. For example, the update location service may provide the client with a location update periodically (e.g., every 60 minutes). In one implementation, the update location service may be event-based, where the location server 22 provides the client 26 with a location update based, on particular conditions. For example, in one implementation, a condition may be a change in location (e.g., when the client 26 enters or leaves a particular area). Also, parameters may define the conditions. For example, in one implementation, the particular area may be defined as a particular room, floor, building, etc.

In particular implementations, the client may obtain location information, in other various ways. For example, in one implementation, the client 26 may obtain its location from DHCP messages extended to include location information. In one implementation, the client 26 may obtain its location from CDP messages extended to include location information. In one implementation, the client 26 may obtain its location from LLDP-MED messages. The switch 24 may access this information from a local storage or alternatively from the location server 22 or from the DCHP server 23, based on a retrieval policy.

Implementations also support configuration changes to the switch 24. For example, a given client may move to a new port or to a new switch (e.g., a laptop or IP phone is plugged into a new cube). Also, an administrator may change a patch panel or switch wiring. In one implementation, the switch 24 may automatically determine the new connection attributes and then pass the information to the client, to other clients or switches, or to the location server to update the configuration database of the location server.

The following example illustrates how a given client 26 may automatically learn its location whenever the client 26 connects to the switch 24, according to another implementation of the invention. In one implementation, where the administrator configures the ports of the switch 24 remotely (e.g., at the location server 22), the location data for a switch port, would be stored at the location server 22. In one implementation, the location server 22 may automatically push the location information to the switch 24. Alternatively, in one implementation, the switch 24 may send a request to the location server 22 for location information (e.g., the location mapped to a switch port) using a location protocol in one implementation, as part of that request, the switch 24 may include a client attribute tuple for updating the configuration database at the location server 22. The location server 22 may then look up the location information and respond to the switch 24. In addition, location server 22 may store (or update) the client attribute tuple associated with other connection attribute information associated with the switch, port, and location. Accordingly, the attribute information for a given client may be later retrieved at the request of user, a process, host, or subscriber to a location service update. In one implementation, any change in the client information or new client association may be used to trigger an update to a registered entity (e.g., a policy server). The switch 24 receives both the DHCP response from the DHCP server 23 and the location protocol response from the location server 22. The switch 24 may then combine the content, and send a DHCP response to the client 26 that contains the IP address, location information, or any other relevant connection attribute information as part of the response.

The present invention has been explained with reference to specific embodiments. For example, while embodiments of the present invention have been described as operating in connection with a switch, the present invention can be used in connection with any suitable network access device, such as a router. Other embodiments will be evident to those of ordinary skill in the art. It is therefore not intended that the present, invention be limited, except as indicated by the appended claims.

What is claimed is:

1. Logic encoded in one or more non-transitory media for execution and when executed operable to:
   establish a link layer connection at a switch with a client on a switch port, wherein the switch port is associated with a port identifier and is mapped to a physical location;
   identify one or more connection attributes of the link layer connection, wherein the connection attributes comprise a network layer address of the client;
   transmit the port identifier and the network layer address of the client to a location server;
   receive a physical location of the client at the switch from the location server; and
   provide the physical location received at the switch from the location server to the client.

2. The logic of claim 1 wherein the logic is further operable to receive one or more port-to-location mappings from the location server, wherein each of the port-to-location mappings maps a particular switch port to a particular physical location.

3. The logic of claim 1 wherein the one or more connection attributes comprises one or more of a client media access control address, an internet Protocol (IP) address, a virtual local area network identification, a switch IP address, username, or Extensible Authentication Protocol ID.

4. The logic of claim 1 wherein the logic is further operable to provide a physical location of the client to the location server.

5. A method comprising:
   establishing a link layer connection at a switch with a client on a switch port, wherein the switch port is associated with a port, identifier and is mapped to a physical location;
   identifying one or more connection attributes of the link layer connection, wherein the connection attributes comprise a network layer address of the client;
   transmitting the port identifier and the network layer address of the client to a location server;
   receiving a physical location of the client at the switch from the location server; and
   providing a physical location of the client to the location server.

6. The method of claim 5 further comprising receiving the one or more port-to-location mappings from the location server, wherein each of the port-to-location mappings maps a particular switch port to a particular physical location.

7. The method of claim 5 wherein the one or more connection attributes comprises one or more of a client media access control address, an Internet Protocol (IP) address, a virtual local area network identification, or a switch IP address, username, or Extensible Authentication Protocol ID.

8. The method of claim 5 further comprising providing the physical location received from the location server to the client.

9. A switch comprising:
one or more processors;
a memory;
a switch fabric comprising one or more switch ports; and
a network application, physically stored in the memory, comprising instructions operable to cause the one or more processors and the switch to:
establish a link layer connection with a client on a switch port, wherein the switch port is associated with a port identifier and is mapped to a physical location;
identify one or more connection attributes of the link layer connection, wherein the connection attributes comprise a network layer address of the client;
transmit the port identifier and the network layer address of the client to a location server;
receive a physical location of the client from the location server; and
provide a physical location of the client to the location server.

10. The switch of claim 9 wherein the network application is further operable to cause the one or more processors and the switch to receive the one or more port-to-location mappings from the location server, wherein each of the port-to-location mappings maps a particular switch port to a particular physical location.

11. The switch of claim 9 wherein the one or more connection attributes comprises one or more of a client media access control address, an Internet Protocol (IP) address, a virtual local area network identification, or a switch IP address, username, or Extensible Authentication Protocol ID.

12. The switch of claim 9 wherein the network application is further operable to cause the one or more processors and the switch to provide a physical location of the client to the location server.

13. A location server comprising:
one or more processors;
a memory;
a network interface; and
a location server application, physically stored in the memory, comprising instructions operable to cause the one or more processors and the location server to:
receive a switch port identification from a switch;
determine a physical location based on a port-to-location mapping; and
enter the physical location in a client location entry;
receive a configuration including one or more port-to-location mappings, wherein each of the port-to-location mappings maps a particular switch port to a particular physical location;
transmit the port-to-location mapping to the switch; and
provide the determined physical location of the client to the switch.

14. The location server of claim 13 wherein the location server application is further operable to cause the one or more processors and the location server to receive a configuration including one or more port-to-location mappings from the switch.

15. The location server of claim 14 wherein the location server application is further operable to cause the one or more processors and the location server to apply a policy to resolve any differences between a locally stored port-to-location mapping and the port-to-location mapping received from the switch.

* * * * *